US008086976B2

(12) United States Patent
Hemmett et al.

(10) Patent No.: US 8,086,976 B2
(45) Date of Patent: Dec. 27, 2011

(54) METHODS FOR STATISTICAL SLEW PROPAGATION DURING BLOCK-BASED STATISTICAL STATIC TIMING ANALYSIS

(75) Inventors: Jeffrey G. Hemmett, St. George, VT (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 12/121,023

(22) Filed: May 15, 2008

(65) Prior Publication Data

US 2009/0288051 A1    Nov. 19, 2009

(51) Int. Cl.
*G06F 9/455* (2006.01)
*G06F 17/50* (2006.01)
(52) U.S. Cl. ........ 716/108; 716/113; 716/132; 716/133; 716/134; 703/19
(58) Field of Classification Search .................. 716/108, 716/113, 132–135; 703/19
See application file for complete search history.

(56) References Cited

U.S. PATENT DOCUMENTS

| 2004/0002844 A1 | 1/2004 | Jess et al. | |
|---|---|---|---|
| 2005/0065765 A1 | 3/2005 | Visweswariah | |
| 2008/0201676 A1* | 8/2008 | Chang et al. | 716/6 |
| 2009/0288050 A1* | 11/2009 | Celik et al. | 716/6 |

OTHER PUBLICATIONS

Abbaspour, et al., "Efficient Variational Interconnect Modeling for Statistical Timing Analysis by Combined Sensitivity Analysis and Model-Order Reduction" 2007, pp. 1-6.
Chang, et al., "Parameterized Block-Based Statistical Timing Analysis with Non-Gaussian Parameters, Nonlinear Delay Functions", DAC Jun. 2005, pp. 71-76.
Chopra, et al., "A New Statistical Max Operation for Propagating Skewness in Statistical Timing Analysis", Proceedings of the 2006 IEEE/ACM International Conference on Computer-aided Design, pp. 237-243.
Goyal, et al. ,"Improved First-Order Parameterized Statistical Timing Analysis for Handling Slew and Capacitance Variation", 20th International Conference on VLSI Design 2007, 5 pages.
Guthaus, "Gate Sizing Using Incremental Parameterized Statistical Timing Analysis", IEEE/ACM International Conference on Computer-Aided Design, Nov. 2005, pp. 1029-1036.
Jess, et al, "Statistical Timing for Parametric Yield Prediction of Digital Integrated Circuits", DAC Jun. 2003, pp. 932-937.

(Continued)

*Primary Examiner* — Thuan Do
*Assistant Examiner* — Nha Nguyen
(74) *Attorney, Agent, or Firm* — Wood, Herron & Evans, LLP (57) ABSTRACT

Methods for statistical slew propagation in static statistical timing analysis. The method includes projecting a canonical approximation of an input slew over a timing path to a first corner and using the projected input slew to calculate a delay and an output slew at the first corner. The method further includes perturbing the canonical approximation of the input slew to a different corner, calculating a delay and an output slew at the different corner using the perturbed input slew canonical, and determining a sensitivity of the delay and the output slew to a plurality of parameters, simultaneous with implicit sensitivity calculations to the input slew, with finite difference calculations between the first corner and perturbed data.

13 Claims, 2 Drawing Sheets

OTHER PUBLICATIONS

Le, et al. "STAC: Statistical Timing Analysis with Correlation", DAC Jun. 2004, pp. 343-348.

Mogal, et al., "Clustering Based Pruning for Statistical Criticality Computation Under Process Variations", Proceedings of the 2007 IEEE/ACM international conference on Computer-aided design, pp. 340-343.

Nardi, et al., "Use of Statistical Timing Analysis on Real Designs", Proceedings of the 2007 conference on Design, automation and test in Europe, pp. 1605-1610.

Visweswariah, "Death, Taxes and Failing Chips", DAC Jun. 2003, 5 pages.

Visweswariah, et al., "First-Order Incremental Block-Based Statistical Timing Analysis", IEEE Transactions on Computer-Aided Design of Integrated Circuits and Systems, 2004, pp. 1-13.

Xiong, et al., "Criticality Computation in Parameterized Statistical Timing", DAC Jul. 2006, 6 pages.

* cited by examiner

METHODS FOR STATISTICAL SLEW PROPAGATION DURING BLOCK-BASED STATISTICAL STATIC TIMING ANALYSIS

FIELD OF THE INVENTION

The invention relates generally to integrated circuit design and, in particular, to statistical static timing analysis for analyzing the timing characteristics of an integrated circuit, before physically fabricating the integrated circuit.

BACKGROUND OF THE INVENTION

Static timing analysis (STA) is used to compute the expected timing of a digital circuit to identify problem areas of an integrated circuit during the design phase and in advance of actual fabrication. Timing runs in STA simulate the timing of the integrated circuit to determine whether or not the integrated circuit meets various timing constraints and, therefore, is likely to operate properly if fabricated in accordance with the tested design.

Deterministic static timing analysis (DSTA) propagates timing quantities, such as arrival times (ATs), required arrival times (RATs), and slews, along with any other timing related quantities (guard times, adjusts, asserts, etc.), in a timing graph as single valued deterministic data. DSTA covers a single corner of a space of process variations with each individual timing run. A corner represents a particular combination of input values for a parameter that may include temperature of the circuit, input voltage, and various manufacturing parameters of an integrated circuit. To evaluate the impact that a given parameter will have on timing, multiple DSTA timing runs must be executed with parameters that affect timing set at several maximum and minimum corners, such as high and low temperature, high and low voltages, and various processing conditions. For example, DSTA timing runs may compare a worst case corner characterized by a combination of high input voltage, a high operating temperature, and the worst manufacturing parameters with a best case corner characterized by a combination of a low input voltage, a low operating temperature, and the best manufacturing parameters.

Timing values are computed for the timing graph at each node based upon the ATs, which define the time (or the time distribution) at which a given signal arrives at a timing point, and the RATs, which defines the time (or the time distribution) at which the signal is required to get to the timing point, in order to meet the timing requirements. These ATs and RATs are used to compute timing metrics in the form of slacks at nodes (RAT minus AT for late mode and AT minus RAT for early mode). A negative value for either a late mode slack or an early mode slack indicates a timing constraint violation. As a check of the performance of the integrated circuit design, DSTA timing runs may examine many or all of the corners and the integrated circuit design may be iteratively adjusted until all of the corners pass the timing tests. These results reflect the extreme performance bounds of the integrated circuit and may require numerous timing runs to fully explore the space of process variations. Even then, the results may be overly pessimistic and misleading for optimization tools.

Block-based statistical static timing analysis (SSTA) propagates timing quantities as probability distribution functions, or their approximation, instead of as single valued deterministic data under DTSA. Statistical minimum and maximum operations used to calculate a node slack for the propagated statistical distribution functions. Typically, slack data is only collected for timing qualification at a subset of all of the timing graph nodes, sometimes referred to as test points or endpoints, which are frequently defined as those timing graph nodes that are either primary outputs of the circuit, or those that control data propagation (e.g., the input to storage elements, such as latches). Multiple slacks are frequently incident at endpoints because of the backward propagated RAT data from upstream nodes and any timing tests that may be present on those nodes (e.g., setup or hold tests). These slacks may be referred to as edge slacks because they arise from the timing and test segments that form the graph edges incident on the node of interest. The final slack value for that node is defined as the statistical minimum of all edge slacks, as this is the limiting slack that can cause timing failure.

A single timing run using block-based SSTA predicts the performance of the integrated circuit over the entire space of process variations. In contrast, a single timing run using DSTA merely predicts a single corner of the space of process variations. Consequently, in order to close timing, a single SSTA timing run may replace multiple DSTA timing runs. For example, assuming the existence of N parameters (i.e., variables or sources of variation) and two corners per parameter, then $2^N$ corners would have to be individually analyzed by discrete DSTA timing runs to match the effectiveness of a single SSTA run. Hence, SSTA is far more computationally efficient than DSTA.

Block-based SSTA also reduces pessimism as a result of the statistical techniques inherent in this approach. A test run that passes in a single process corner under in a DSTA timing run may actually fail without detection in one or more other performance-limiting corners in the process space, which a SSTA timing run would reveal. SSTA can, therefore, reduce the exaggerated pessimism inherent in DSTA. For example, the propagation of known independently random terms in SSTA allows for taking the square root of the sum of the squares of random quantities (RSSing) between each propagation state, rather than straight summation as in DTSA. Other pessimism relief may occur when sampling the final distributions, as additional RSSing may occur between terms during projection from a distribution to some example sample value. Finally, information regarding the probability of particular failure modes may be obtained in SSTA, as opposed to DSTA that merely indicates a binary pass/fail condition. SSTA may allow for very low probability fails to be ignored while also allowing for a more aggressive clipping of the statistical tails when used with at-speed tests.

In block-based SSTA, the probability distribution functions for many timing quantities in the delay model are approximated in a canonical or first order form. A timing quantity Q is approximated in canonical form at a particular corner, which represents a combination of input values for the parameters $p_1, \ldots p_N$, by a first-order Taylor series expressed as:

$$Q\{p_1, \ldots p_N\} = Q_0 + \sum_{i=1}^{N} \{dQ/dp_i * (p_i - p_{i0})\},$$

where $Q_0$ is the nominal value of the timing quantity, and $dQ/dp_i$ is the derivative of the timing quantity Q with respect to parameter $p_i$. The nominal value of the timing quantity $Q_0$ is evaluated at a nominal corner characterized by nominal values of the parameters $p_0 = (p_{i0}, \ldots p_{N0})$. If the variation in the $i^{th}$ parameter $p_i$ is treated as a random variable $R_i$ characterized by a zero mean and a unit variance, and the actual parameter $p_i$ has a variance equal to $\sigma_i$, the canonical form of the timing quantity Q is equivalent to:

$$Q(p_1, \ldots p_N) = Q_0 + \sum_{i=1}^{N} \{dQ/dpi * \sigma_i * R_i\}.$$

Because there are generally multiple different parameters of interest, there are also multiple different $dQ/dp_i$ derivatives. The sensitivities ($dQ/dp_i$ derivatives) may be computed via forward finite differencing by finding the timing quantity Q at an arbitrary base corner $p_b$, and using this base corner in common as one end of each finite difference derivative. If the parameter input values at the base corner $p_b$ are equal to $(p_{1b}, \ldots p_{Nb})$, and the parameter input values at another corner $(p_b + \Delta p_i)$ are equal to $(p_{1b}, \ldots p_{ib} + \Delta p_i, \ldots p_{Nb})$, then $dQ/dp_i$ is equal to $\{Q(p_b + \Delta p_i) - Q(p_b)\}/\Delta pi$.

The base corner $p_b$ may have each of the parameter input values at one end of its allowed or reachable range (e.g., $p_{i,min}$, which might be a negative three sigma point for the parameter), and $\Delta p_i$ is the extent of the reachable range (e.g., $p_{i,max} - p_{i,min}$). The advantage of using an end of the parameter range at a base corner $p_b$, rather than the parameter mean, is that, in N+1 calculations of the timing quantity Q, derivative estimates may be obtained that reflect the full range of the parameters. Starting at a mean or nominal value of each parameter, 2N+1 calculations of the timing quantity Q, each of which perturbs each parameter $p_i$ either above $p_{i0}$ or below $p_{i0}$, must be performed. Otherwise, the calculated $dQ/dp_i$ derivatives would be based on only half the range of each parameter.

If the base corner $p_b$ differs from the nominal corner $p_0$, then the nominal delay $D_0$ should be computed from the base corner $p_b$, rather than by directly computing the delay at the nominal corner $p_0$. Otherwise, the delay D computed by applying the canonical delay equation at the base corner $p_b$ may not match the actual base corner delay. Thus, under these circumstances, the canonical form of the delay may be expressed as:

$$D_0 = D(p_b) + \sum_{i=1}^{N} \{(p_{i0} - p_b) * dD/dpi\}.$$

Delays and slews are particular timing quantities in block-based SSTA that are approximated in canonical form. Each of these quantities depends on various non-timing parameters including, but not limited to, transistor effective lengths ($L_{eff}$), metal layer widths, temperature, and voltage. In addition, both the delay and output slew of a particular cell in a digital design will depend explicitly on the input slew to that gate. The input slew, as well as the output slew, of a timing signal reflects the slope or transition time of the timing signal. For example, the input slew at a gate may be set equal to the time required for the waveform propagated as the corresponding timing quantity to transition from a multiplicative factor of 0.1 times the supply voltage ($V_{dd}$) to a multiplicative factor of 0.9 times $V_{dd}$.

Although delay depends on input slew, the input slew itself has a canonical approximation. It may be desirable to eliminate the dependence of the delay on slew to obtain a canonical delay that depends only on other values that are not themselves timing quantities. Conventionally, this feat was accomplished by computing a single derivative of delay, D, with respect to input slew and, then, using chain ruling to eliminate the slew dependence. Thus, the canonical form of the delay can be expressed by:

$$D = D_0 + \sum_{i=1}^{N} \{dD/dp_i * (p_i - p_{i0})\} + dD/dSlew * \left( \sum_{i=1}^{M} \{dSlew/dp_i * (p_i - p_{i0})\} + S_o \right)$$

As above, if variation in the $i^{th}$ parameter $p_i$ is represented by a random variable $R_i(0,1)$ having a zero mean and a unit standard deviation, this expression is equivalent to:

$$D = D_0 + \sum_{i=1}^{N} \{dD/dp_i * \sigma_i * R_i\} + dD/dSlew * \left( \sum_{i=1}^{M} \{dSlew/dp_i * \sigma_i * R_i\} + S_o \right),$$

where the summation ranges differ because the delay and the input slew may have dependencies on different parameters, and dD/dSlew is computed just like any other delay derivative.

A problem with the use of a single sensitivity value dD/dSlew in the calculation of the delay is that the dependence of the delay on input slew may vary significantly across the parameter space, which may lead to significant errors. In particular, the delay sensitivity to slew can be highly non-linear as a function of process corner.

Accordingly, there is a need for an improved method for statistical slew propagation during block-based SSTA that overcomes these and other deficiencies of conventional block-based SSTA that arise from the non-linearity of the sensitivity of delay to slew.

SUMMARY OF THE INVENTION

In an embodiment of the invention, a method is provided for statistical slew propagation in static statistical timing analysis. The method includes projecting a canonical approximation of an input slew to a first corner and, if a value of a given parameter is not equal to a current value of the given parameter at the first corner, perturbing the value of the given parameter to a second corner. The projected canonical approximation of the input slew is used to calculate a first delay and a first output slew at the first corner. The method further includes projecting the canonical approximation of the input slew to the second corner for the given parameter, perturbing a value of the given parameter to the second corner, and calculating a second delay and a second output slew at the second corner using at least one of the perturbed value of the given parameter or the perturbed canonical approximation of the input slew. A delay sensitivity and an output slew sensitivity to the given parameter are determined using finite difference calculations between the first delay and the first output slew at the first corner and the second delay and the second output slew at the second corner. Simultaneously, delay sensitivity and output slew sensitivity to the input slew are calculated when determining the delay sensitivity and the output slew sensitivity to the given parameter.

By performing these slew perturbations, the second order effect that input slew has on delay and output slew is implicitly included in the sensitivity calculation for the delay and the output slew. Alternatively, after the output slew sensitivity for each of the parameters is calculated, data collected from these per-parameter slew perturbations may be used to explicitly calculate second order finite difference calculations. For any particular parameter upon which the input slew is sensitive and the delay and/or output slew is not sensitive, additional perturbations of the input slew may be required in order to account for the pure second order effects in the delay and the output slew.

DETAILED DESCRIPTION

Figure 1:
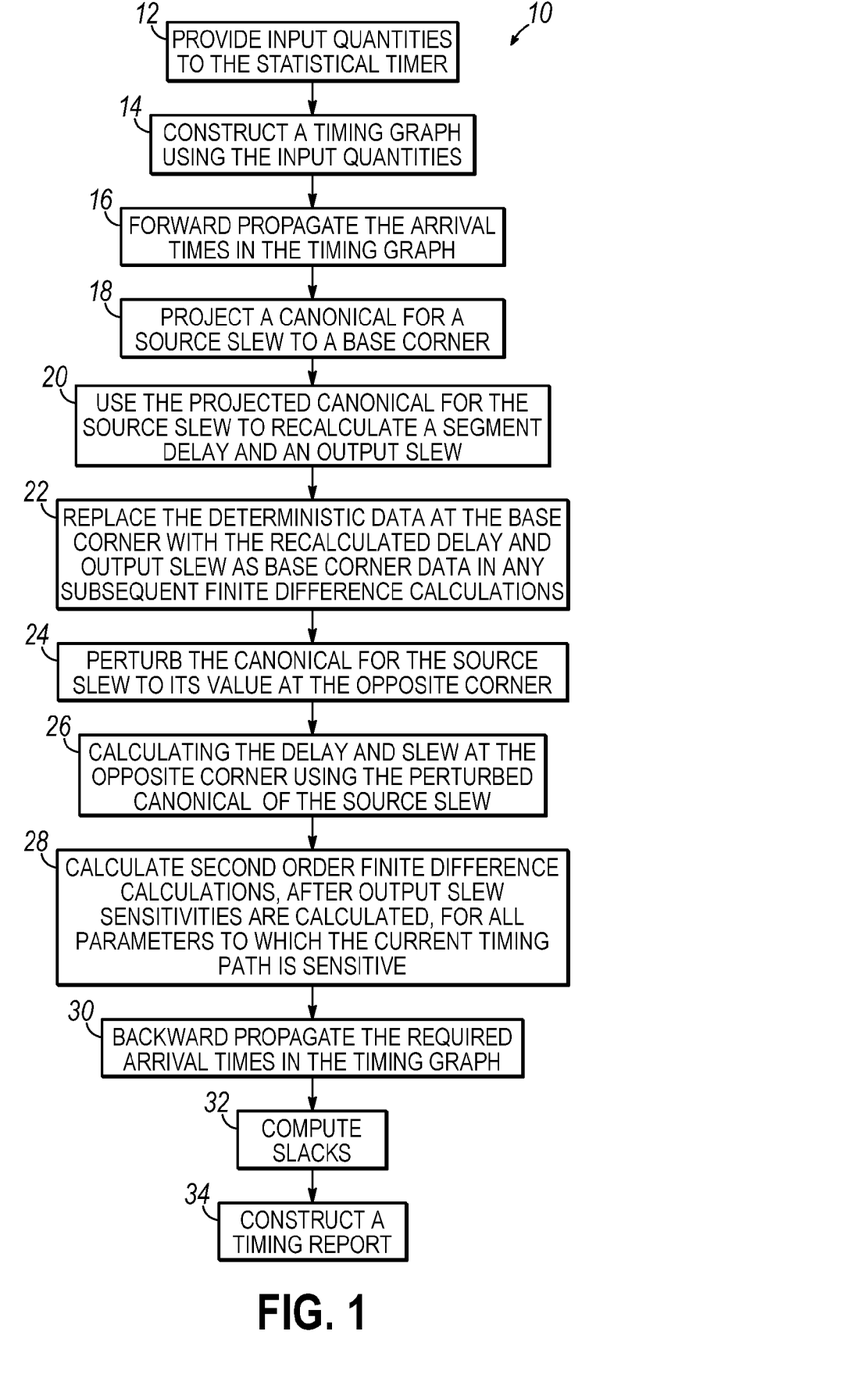
FIG. 1 is a flow chart of a method of conducting statistical static timing analysis in accordance with an embodiment of the invention.

With reference to FIG. 1, a process flow 10 for a statistical timer that performs statistical static timing analysis (SSTA) is shown. The statistical timer utilizes a block-based approach to SSTA that propagates probability distribution functions, or an approximation thereof, from each node to the successive node and, so on, until each probability distribution function reaches a sink node. The probability distribution functions are propagated using a statistical maximum operation for early mode ATs (setup timing constraint) or a statistical minimum operation for late mode ATs (hold timing constraint).

In block 12, inputs are supplied to the statistical timer. Specifically, the statistical timer reads and flattens a netlist representing the structure of the circuit to be analyzed, a set of timing assertions, a set of canonical delay models governing the sources of variation in the space of process variations, sensitivities relating the delay attributable to each individual parameter, and statistical information describing the sources of variation. The timing assertions, each of which can be either deterministic or probabilistic, may include arrival times at the primary inputs, required arrival times at the primary outputs, information about the phases of the clock, and details of external loads that are driven by the primary outputs. The canonical delay model, which may be parameterized first-order expansion, permits the statistical timer to determine the delay of a gate or wire as a function not only of traditional delay-model variables, like input slew or rise/fall time of the signal, and output load, but also as a function of the sources of variation.

Figure 2:
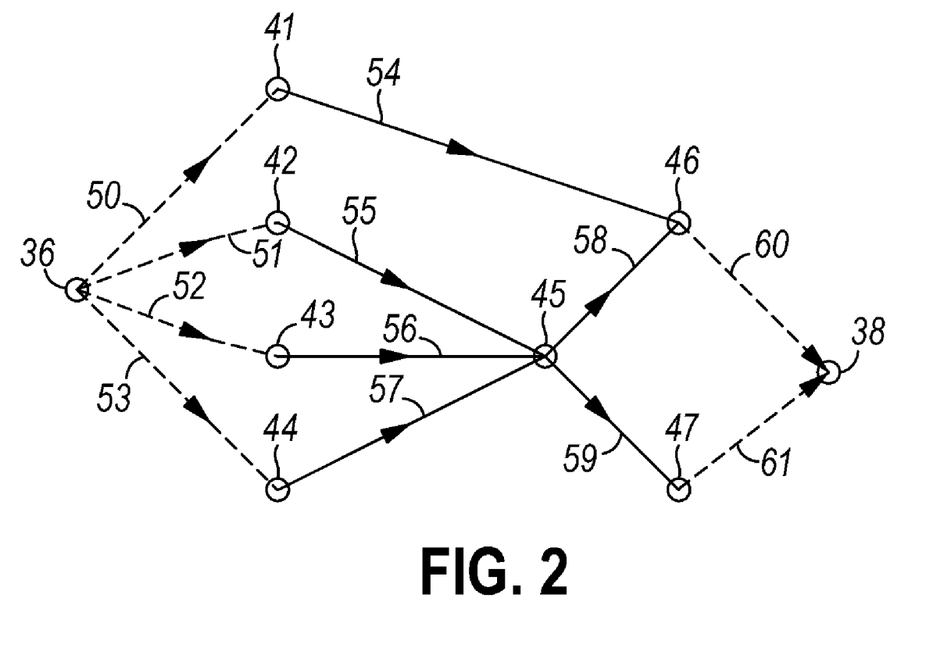
FIG. 2 shows a representative timing graph generated by a timing run in statistical static timing analysis.

In block 14, the statistical timer constructs a timing graph based upon the netlist. The timing graph consists of nodes at which signal transitions occur and edges representing delays in the circuit incurred when a logical transition is transmitted through a circuit component, such as a gate or wire. The logical transition may be logical transition either from low to high or from high to low. Each timing arc or path between a source node and a sink node within the timing graph is defined by a set of logic elements through which a signal propagates and by the path(s) within each element through which the signal travels to get from an input of the element to an output of the same element. A representative timing graph is shown in FIG. 2 that includes a source node 36, a sink node 38, a plurality of nodes 41-47 connected between the source node 36 and sink node 38, and edges 50-61. Nodes 41-44 represent primary inputs of the circuit represented by the timing graph and nodes 46, 47 represent primary outputs. The source node is a place in a design description where data is launched by a reference signal edge and the sink node is a place in the design description where data is captured by a reference signal edge.

In block 16, the statistical timer calculates a signal propagation delay corresponding to each individual timing path in the timing graph. For each timing path, the statistical timer computes early mode ATs and late mode ATs at each node by forward propagating signals in the form of canonical approximations of their probability distribution functions from the source node to the sink node. A late mode AT is the latest time at which the corresponding signal is guaranteed to be stable at its correct logical value after the signal has traversed any of the possible paths of the integrated circuit. An early mode AT is the earliest time at which the corresponding signal can change from its stable logical value during the previous clock cycle.

Typically, ATs are stored on the nodes of the timing graph and delays of individual gates and wires are stored on the edges of the timing graph. Signals are propagated through edges by adding edge delays to signal ATs. When multiple ATs are propagated along different edges to each of the nodes, the AT at each node is computed as the statistical maximum (for late mode ATs) or the statistical minimum (for early mode ATs) of the incoming edge delays. The output of a node cannot change earlier than the early mode AT. At each node, the mean and variance of the statistical maximum AT is calculated using either analytical formulas or numerical methods, which are understood by a person having ordinary skill in the art of SSTA. Each output parameter sensitivity is computed as a linear combination of all input data (upstream AT+respective edge delays). Each input is weighted by a respective tightness probability, which generally represents the probability that a random variable is the greatest of a set of random variables. Arrival tightness probabilities are determined that reflect the probabilities that the AT at each of the nodes may be dominated by one or the other of the incoming edges. The first and second moments of the resulting distribution are matched by selecting an appropriate mean and random sensitivity.

In accordance with an aspect of the invention, during parameter finite differencing, the canonical approximation of the input slew supplied by the canonical delay model is projected to the appropriate base and opposite corners. The projection of the canonical approximation of the input slew is performed in addition to parameter perturbation. In block 18, the canonical approximation of the input slew is used to project to the base corner, which represents the starting corner where the underlying timing run is occurring. The statistical timer calculates a deterministic value for the output slew at the base corner.

In block 20, if the projected input slew at the base corner differs by a given amount or threshold from the deterministic value of the output slew at the base corner, the projected input slew at the base corner is used to re-calculate the delay and output slew for the corresponding segment of the timing path. The re-calculated delay and output slew are used in subsequent sensitivity calculations in block 22. If not, then the deterministic value of the input slew calculated at the base corner is used in subsequent sensitivity calculations.

In block 22, the re-calculated delay and output slew are used as the base corner data in any subsequent finite difference calculations, rather than the deterministic value of the delay and the deterministic value of the output slew. As mentioned above, the projected input slew at the base corner must differ by a given amount from the deterministic value of the output slew at the base corner before the delay and output slew are re-calculated and used as replacement base corner data. This comparison with the deterministic value of the output slew allows for self-consistency within the procedure and may be important in order to obtain accurate and physically meaningful results. In the absence of this check and subsequent base corner re-calculation at the projected source slew value, the re-calculated output slews can, for example, project to negative values, which is not permitted.

In one embodiment, the slew sensitivities $(dD/dSlew)_i$ may be explicitly computed as the respective values evaluated by finite differencing the value of the input slew at the base corner and the value of the input slew at the (base plus $\Delta p_i$) opposite corner. This is expressed mathematically as:

$$(dD/dSlew)_i = \{D(p_b + \Delta p_i, Slew) - D(p_b + \Delta p_i, Slew + \Delta Slew)\}/\Delta Slew$$

Alternatively, the slew sensitivity dD/dSlew may be computed from the average of the values of the input slew at the base corner and the (base plus $\Delta p_i$) corner, or at corner halfway between these corners (i.e., at the (base+$\Delta p_i$/2) corner).

In the explicit approach for each parameter to be finite differenced, the input slew is perturbed in block 24 to its opposite corner value for that parameter before calculating the delay and the output slew at the opposite corner. The perturbation is for the purpose of obtaining a parameter specific sensitivity of the delay and the output slew to the input slew. This parameter specific sensitivity of the delay and the output slew to input slew is then used during the finite difference calculation at the opposite corner to formally chain rule in the source slew effects.

In block 26, for each parameter to be finite differenced, the delay and the output slew are calculated at the opposite corner. Using this explicit approach for calculation of parameter specific slew sensitivities, the canonical delay is expressed as:

$$D = D_0 + \sum_{i=1}^{N} \{dD/dp_i * (p_i - p_{i0})\} + \sum_{i=1}^{M} \{(dD/dSlew)_i * dSlew/dp_i * (p_i - p_{i0})\}$$

or, equivalently, as:

$$D = D_0 + \sum_{i=1}^{N} \{dD/dp_i * \sigma_i * R_i\} + \sum_{i=1}^{M} \{(dD/dSlew)_i * dSlew/dp_i * \sigma_i * R_i\}$$

In an alternate embodiment, the slew sensitivity $(dD/dSlew)_i$ is not explicitly calculated. Instead, during the finite difference calculation of the parameter sensitivities for the delay and the output slew, the input slew is perturbed for each parameter to the opposite corner for that parameter. This perturbed input slew for each parameter is used in the calculation of the opposite corner delay and output slew. This use of the perturbed input slew implicitly includes the second order slew effects.

In this implicit approach, in cases where the slew and delay depend on common parameters, the calculation of the parameter sensitivities $(dD/dp_i)$ and the slew sensitivities $(dD/dSlew)$, for each parameter can be combined. In other words, the vector sum of the parameter sensitivities $(dD/dp_i)$ and the slew sensitivities $(dD/dSlew)_i$ for each parameter may be directly computed, instead of computing the two vector quantities separately and adding them together. This may be expressed mathematically as:

$$D = D_0 + \sum_{i=1}^{N} \{(p_i - p_{i0}) * [D(p_b + \Delta p_i, Slew(p_b + \Delta p_i)) - D(pb, Slew(p_b))]/\Delta p_i\}$$

or $$D = D_0 + \sum_{i=1}^{N} \{\sigma_i * R_i * [D(p_b + \Delta p_i, Slew(p_b + \Delta p_i)) - D(p_b, Slew(p_b))]/\Delta p_i\}$$

Thus, under these circumstances, the total derivative of delay with respect to the parameter $p_i$ is represented by the finite difference $\{D(p_b + \Delta p_i, Slew(p_b + \Delta p_i)) - D(p_b, Slew(p_b))\}/\Delta p_i$. This perturbation-based approach eliminates formal chain ruling for those parameters that both the delay and the input slew, or both the output slew and the input slew, have in common. At the same time, the non-linear functional dependence of the delay and output slew sensitivity to input slew as a function of process corner is maintained.

Regardless of whether the implicit approach or explicit approach is applied, the slew sensitivity $(dD/dSlew)_i$ for each parameter used in the delay calculation represents an improved estimate of the slew sensitivity across the range of all parameters, $p_i$, than achievable conventionally using chain ruling and a single value for the slew sensitivity (dD/dSlew) that is independent of the parameters.

For any parameter on which input slew does not depend, the delay and output slew are simply evaluated at the perturbed base corner $(p_b + \Delta p_i)$ using the value of the source slew evaluated at the base corner $p_b$, so the derivative computed is simply $dD/dp_i$.

In block 28, once all parameters, $p_i$, to which the current timing path is sensitive have respective output slew sensitivities calculated, additional sensitivity calculations are typically required to capture the pure second order effect the input slew has on the output data, for all parameters which the input slew is sensitive to that the current timing segment is not. In one embodiment, the input slew is perturbed for all such parameters to execute the higher order finite difference calculations. In another embodiment, rather than finite difference every parameter present in the input slew that is not present in the current timing path, only the parameter(s) (i.e., at least one parameter) with the largest sensitivities may have the higher order finite difference calculations performed, to capture the dominant effects accurately. The remainder of the parameters are formally chain ruled, using data from the parameter(s) that were finite differenced, to compute the delay and the output slew sensitivity. This approach permits the use of a sliding scale that balances accuracy and performance by setting different sensitivity thresholds at which the formal chain ruling is allowed. Alternatively, other criteria may be used. Exemplary criteria include, but not limited to, using the single absolute valued maximum output slew sensitivity, using the maximum positive and negative output slew sensitivity, or using a set of all output slew sensitivities that exceed the sensitivity threshold. If multiple output slew sensitivities are used, the accuracy may be improved by calculating a weighted average of the delay and output slew sensitivity to input slew from the results.

These pure second order calculations are required for any parameter(s) that the input slew depends on to which the delay and/or output slew is not sensitive. Assuming M such parameters, $D(p_b, \text{Slew})$ is equal to $D(p_b+\Delta p_i, \text{Slew})$ for any given slew value because the variation in $p_i$ does not directly affect the delay, D. However, additional delay and/or output slew calculations at a perturbed source slew are required in order to account for the pure second order effects.

In one embodiment, $D(p_b, \text{Slew}(p_b+\Delta p_i))$ is computed for a perturbation $\Delta p_i$ in each of the M parameters, $p_i$, and used in the additional, pure second order calculations. Although the number of delay computations is not reduced, the $\Delta$Slew used for each parameter, $p_i$, will more accurately reflect the amount of variation in slew that could be seen due to a change in the corresponding parameter. Because the $\Delta$Slew values for different $\Delta p_i$ values may be very close to the same, some of these delay calculations may be considered somewhat redundant if the dD/dSlew relation is fairly linear about the current operating point within the range of the complete set of possible slew perturbations.

In an alternative embodiment, a single $D(p_b, \text{Slew}(p_b)+\Delta\text{Slew})$ can be computed only once for the purpose of calculating a single dD/dSlew to be used for all M parameters, $p_i$, to which the source slew is sensitive and to which the current segment is not sensitive. In this case, $\Delta$Slew is a representative delta (e.g., an average or a maximum) across the $(p_b+\Delta p_i)$ corners for all such parameters $p_i$. In this embodiment, a single delay calculation is required for these parameters, instead of individual calculations for each of the M parameters, which may improve performance. This approach may be optimal when dD/dSlew is known to be nearly linear about the operating point, because it incurs no loss in accuracy in this case. In this embodiment, the second order finite difference calculations for delay and slew may occur by perturbing only a single (e.g., the dominant) input slew sensitivity and, then, formally chain ruling the remaining (M−1) sensitivities using the results of the single dominant perturbed parameter.

In yet another alternative embodiment, similar to the above approach, a single dSlew/dp$_i$ may be computed that accounts for variation in the slew both above and below the slew at the base corner, Slew($p_b$). For example, a single delay sensitivity to input slew (dDelay/dSlew) may be computed as:

$$d\text{Delay}/d\text{Slew}=\{D(p_b,\text{Slew}(p_b)+\Delta\text{Slew}/2)-D(p_b,\text{Slew}(p_b)-\Delta\text{Slew}/2)\}/\Delta\text{Slew}$$

In this alternative embodiment, only two delay calculations are required instead of individual delay calculations for each of the M parameters. One delay calculation is above the nominal point and another delay calculation is below the nominal point.

In yet another alternative embodiment, process corners are separated or categorized into corners for which the value of $\Delta$Slew is positive and corners for which the value of $\Delta$Slew is negative. Separate values of output slew sensitivity are calculated for a positive slew perturbation and for a negative slew perturbation. Each parameter is chain ruled with the output slew sensitivity for the $\Delta$Slew direction matching that for the particular parameter perturbation $\Delta p_i$ at each corner. In this embodiment, only two delay calculations are required for all parameters, as opposed to one delay calculation for each parameter.

In yet another embodiment that leverages the above approach, if the two sensitivities found are the same within some tolerance, then the dD/dSlew relation is known to be nearly linear, and the procedure may proceed as described above. If they differ significantly, then the relation is known to be non-linear, and the solution approach can revert to calculating a dD/dSlew for each of the M parameters for maximal accuracy.

In block 30 and after the conclusion of forward propagation, probabilistic distributions representing RATs are backward propagated by the statistical timer through the timing graph. When multiple RATs are propagated along different edges to a node, the RAT at the node is computed as the statistical maximum (for early mode RATs) or the statistical minimum (for late mode RATs) of the RATs of the incoming edges. A late mode RAT indicates the latest time within the clock period of a given clock phase that a signal transition may occur at the node without violating a timing constraint. An early mode RAT indicates the earliest time within the clock period of a given clock phase that a signal transition may occur at the node without violating a timing constraint. Delays are subtracted from RATs in backward propagation as timing progresses from the sink node back to the source node. Required arrival tightness probability of an edge is defined as the probability that the RAT at a node is determined by that edge.

In addition to the propagated RATs described above, the RAT calculation also considers any timing constraints that are incident on the current node. These include things such as setup and hold constraints at latch inputs, as well as pulse width tests, loop cut tests, clock gating tests, etc. Setup timing constraints enforce a maximum delay on a timing path relative to the reference signal path. Hold timing constraints enforce a minimum delay on a timing path relative to the reference signal path. Each constraint also contributes a RAT indicating the timing results of that constraint on the current incident node. These constraints may be handled in a manner analogous to propagated RATs, as they can also be represented as additional edges in a timing graph (either in physical embodiment or theoretically), although these are virtual edges between whose ends a test result is calculated, rather than a true physical path for timing propagation. So, the data considered when calculating a minimum slack (or max/min RAT) considers all incident constraint data in addition to all incident propagated data.

In block 32, the statistical timer uses a difference between the ATs and RATs to compute timing metrics in the form of slacks at each of the nodes, which are defined as (RAT minus AT) for late mode and (AT minus RAT) for early mode so that a negative slack value will always indicate a violation of a setup or hold timing constraint. A positive slack indicates an amount of time by which a violation of a timing constraint is avoided by a path delay. Typically, slack data is only collected for timing qualification at a subset of all of the timing graph nodes, sometimes referred to as test points or endpoints. These endpoints are frequently defined as those nodes that are either primary outputs of the circuit, or those nodes that control data propagation (e.g., the input to storage elements, such as latches).

Conversely, block 32 may be skipped, with no explicit slack calculation being performed during timing propagation. It is understood by a person having ordinary skill in the art that calculation of the worst RAT will always yield the worst slack. That is, in early mode, calculation of the maximum RAT will always produce the same solution as explicit calculation of the min slack, and in late mode, calculation of the minimum RAT will also produce the correct min slack solution. Therefore, the slack calculations may be postponed until they are required for reporting or optimization purposes, if this approach is preferred. The RAT and slack are interchangeable, and either may be propagated with equivalent results, so the embodiments of the invention apply equally well to either explicit min slack calculations, or to maximum/minimum RAT calculations.

In block 34, the statistical timer produces a timing report. Information generated in the timing report may be used to constrain timing paths during circuit synthesis to reduce timing constraint violations. The timing report typically includes ATs, RATs, slacks, and slews, expressed as probability distributions, at each timing point of the integrated circuit. Specifically, the information in the timing report may include, but is not limited to, mean value and variance for each timing quantity, a parameterized representation of the distribution of each timing quantity, a graphical representation of the distribution of each timing quantity, and a correlation report between these various timing quantities. Various automatic audits, such as checking for excessive parameter sensitivities, may be built into the timing report.

Applicants hereby incorporate by reference herein the entire disclosure of U.S. Publication No. 2005/0065765, published Mar. 24, 2005 from Ser. No. 10/666,353 filed Sep. 19, 2003 and entitled "System and Method for Statistical Timing Analysis of Digital Circuits", for additional description of the SSTA process.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method for statistical slew propagation in static statistical timing analysis, the method comprising:
projecting a canonical approximation of an input slew to a first corner by using a computer;
using the projected canonical approximation of the input slew to calculate a first delay and a first output slew;
projecting the canonical approximation of the input slew to a second corner;
perturbing the input slew to the second corner;
calculating a second delay and a second output slew at the second corner using the input slew perturbed to the second corner;
determining a delay sensitivity to the input slew and an output slew sensitivity to the input slew using finite difference calculations between the first delay and the first output slew at the first corner and the second delay and the second output slew at the second corner;
identifying a set of parameters to which the input slew is sensitive, but to which at least one of the first and second delays or the first and second output slews are not sensitive; and
modeling pure second order contributions of the parameters in the set on the at least one of the first and second delays or the first and second output slews.

2. The method of claim 1 wherein modeling the pure second order contributions further comprises:
perturbing the input slew for each of the parameters in the set to execute finite difference calculations of the pure second order contributions.

3. The method of claim 1 wherein modeling the pure second order contributions further comprises:

determining a first fraction of the set of the parameters for which an absolute value of a sensitivity of the input slew to each of the first fraction of the set of the parameters is greater than a threshold sensitivity;
perturbing the input slew for the first fraction of the parameters;
determining a second fraction of the set of the parameters for which the sensitivity of the input slew to each of the first fraction of the set of the parameters is not greater than the threshold sensitivity; and
chain ruling the input slew for the second fraction of the parameters using the sensitivity to the input slew defined when the input slew is perturbed for the first fraction of the parameters.

4. The method of claim 3 wherein chain ruling the input slew for the second fraction of the parameters further comprises:
calculating the delay sensitivity and the output slew sensitivity when the input slew is perturbed for the first fraction of the parameters.

5. The method of claim 1 wherein modeling the pure second order contributions further comprises:
determining a first parameter from among the set of the parameters for which an absolute value of a sensitivity of the input slew exceeds a threshold sensitivity; and
perturbing the input slew for the first parameter to execute finite difference calculations of the pure second order contributions.

6. The method of claim 5 further comprising:
calculating the delay sensitivity and the output slew sensitivity when the finite difference calculations of the pure second order contributions are executed.

7. The method of claim 1 wherein modeling the pure second order contributions further comprises:
determining a first parameter from among the parameters in the set that has a maximum positive value for a sensitivity of the input slew; and
perturbing the input slew for the first parameter.

8. The method of claim 7 further comprising:
calculating the delay sensitivity and the output slew sensitivity when the input slew is perturbed for the first parameter; and
setting a chain rule sensitivity to the input slew equal to the delay sensitivity and the output slew sensitivity when modeling the pure second order contributions of the parameters upon which the sensitivity of the input slew has a positive value.

9. The method of claim 1 wherein modeling the pure second order contributions further comprises:
determining a first parameter from among the set of the parameters that has a maximum negative value for a sensitivity of the input slew; and
perturbing the input slew for the first parameter.

10. The method of claim 9 further comprising:
calculating the delay sensitivity and the output slew sensitivity when the input slew is perturbed for the first parameter; and
setting a chain rule sensitivity to the input slew equal to the delay sensitivity and the output slew sensitivity when modeling the pure second order contributions of the parameters upon which the sensitivity of the input slew has a negative value.

11. A method for statistical slew propagation in static statistical timing analysis, the method comprising:
projecting a canonical approximation of an input slew to a first corner by using a computer;

using the projected canonical approximation of the input slew to calculate a first delay and a first output slew;

projecting the canonical approximation of the input slew to a second corner;

perturbing the input slew to the second corner;

calculating a second delay and a second output slew at the second corner using the input slew perturbed to the second corner;

determining a delay sensitivity to the input slew and an output slew sensitivity to the input slew using finite difference calculations between the first delay and the first output slew at the first corner and the second delay and the second output slew at the second corner;

retrieving a deterministic value of the input slew at the first corner; and comparing the deterministic value of the input slew at the first corner with the projected canonical approximation of the input slew at the first corner to determine a difference between the projected canonical approximation of the input slew at the first corner and the deterministic value of the input slew at the first corner.

12. The method of claim 11 further comprising:

using the projected canonical approximation of the input slew at the first corner to calculate the delay and the output slew at the first corner only if the difference is greater than a given threshold.

13. The method of claim 11 further comprising:

using the existing deterministic values for the delay and the output slew as the first corner data with no additional delay calculations if the difference is not greater than a given threshold.

* * * * *